(12) United States Patent
Kim et al.

(10) Patent No.: US 6,478,479 B1
(45) Date of Patent: Nov. 12, 2002

(54) OPTICAL CONNECTOR MODULE WITH OPTICAL FIBERS FOR CONNECTING OPTICAL MODULE AND OPTICAL FIBER CONNECTOR

(75) Inventors: Dae-jin Kim, Suwon (KR); Jong-hwa Won, Suwon (KR); Jong-ho Choi, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 63 days.

(21) Appl. No.: 09/695,599

(22) Filed: Oct. 25, 2000

(30) Foreign Application Priority Data

Feb. 25, 2000 (KR) .............................................. 00-9387

(51) Int. Cl.⁷ ................................................ G02B 6/36
(52) U.S. Cl. ........................................... 385/92; 385/83
(58) Field of Search .............................. 385/83, 65, 89, 385/92, 132, 49, 50

(56) References Cited

U.S. PATENT DOCUMENTS

| | | | |
|---|---|---|---|
| 5,155,785 A | * | 10/1992 | Holland et al. ................ 395/89 |
| 5,732,173 A | * | 3/1998 | Bylander et al. .............. 385/49 |
| 6,173,096 B1 | * | 1/2001 | Bagley et al. ................ 358/50 |

* cited by examiner

*Primary Examiner*—Brian Sircus
*Assistant Examiner*—Son V. Nguyen
(74) *Attorney, Agent, or Firm*—Sughrue Mion, PLLC

(57) ABSTRACT

An optical connector module includes: a light emitting device which emits light and a light receiving device which receives light to convert an optical signal into an electrical signal; a connector including an optical fiber for light transmission and an optical fiber for light reception; a housing for coupling the optical module to the connector; and a light transmission device which is installed in the housing. The light transmission device includes an optical fiber for light transmission, one end of which is disposed on the side of the light emitting device so as to transmit light from the light emitting device to the optical fiber for light transmission of the connector and the other end of which is disposed on the side of the optical fiber for light transmission of the connector, and an optical fiber for light reception, one end of which is disposed on the side of the light receiving device so as to transmit light from the optical fiber for light reception of the connector to the light receiving device and the other end of which is disposed on the side of the optical fiber for light reception of the connector. The distance between one end of the optical fiber for light transmission which is disposed in the housing and one end of the optical fiber for light reception which is disposed in the housing is greater than the distance between the other end of the optical fiber for light transmission which is disposed in the housing and the other end of the optical fiber for light reception which is disposed in the housing.

3 Claims, 2 Drawing Sheets

OPTICAL CONNECTOR MODULE WITH OPTICAL FIBERS FOR CONNECTING OPTICAL MODULE AND OPTICAL FIBER CONNECTOR

BACKGROUND OF THE INVENTION

1. Field of the Invention

The present invention relates to an optical connector module and, more particularly, to an optical connector module having an improved structure for transmitting light between optical devices and optical fibers.

2. Description of the Related Art

An example of an optical connector module for converting an electrical signal into an optical signal to transmit the optical signal to an optical fiber or receiving an incident optical signal from the optical fiber to convert the optical signal into an electrical signal is shown in FIGS. 1 and 2. Referring to FIGS. 1 and 2, a conventional optical connector module includes an optical module 10, a connector 30, and a housing 20 combining the optical module 10 and the connector 30 together. The optical module 10 includes a frame 11, a light emitting device 12, a light receiving unit 13, and first lenses 14. The light emitting device 12 converts an electrical signal into an optical signal and the light receiving unit 13 converts an optical signal into an electrical signal, both of which are installed within the frame 11. The first lenses 14 are comprised of a pair of lenses so as to focus light emitted from the light emitting device 12 and light incident from the light receiving device 13.

An optical fiber 32 for transmitting light from the light emitting device 12 and an optical fiber 33 for transmitting light to the light receiving device 13 are installed within the connector 30. The housing 20 includes first and second reflecting mirrors 21 and 22 for reflecting light emitted from the light emitting device 12 to the optical fiber 32 for light transmission, and a third reflecting mirror 23 for reflecting light received from the optical fiber 33 for light reception to the light receiving device 13. Reference numeral 24 denotes a pair of second lenses which are disposed between the second reflecting mirror 22 and the optical fibers 32 and 33 for focusing incident light.

Referring to FIG. 2, D denotes the distance between the optical axis of the light emitting device 12 and the optical axis of the light receiving device 13, which is relatively long compared to the distance d between the optical axes of the respective optical fibers 32 and 33. Thus, a plurality of the reflecting mirrors 21, 22 and 23 is installed in order to connect optical paths between the light emitting device 12 and the optical fiber 32 for light transmission and between the light receiving device 13 and the optical fiber 33 for light reception. The light emitted from the light emitting device 12 changes its optical path while being reflected by the first and second reflecting mirrors 21 and 22 and is incident on the optical fiber 32 for light transmission, while the light emitted from the optical fiber 33 for light reception changes its optical path while being reflected by the second and third reflecting mirrors 22 and 23 and is incident on the light receiving device 13.

Light is reflected by two reflecting mirrors and passes through air along optical paths between the light emitting device 12 and the optical fiber 32 for light transmission and between the light receiving device 13 and the optical fiber 33 for light reception, respectively. As the light travels, the intensity decreases due to loss when the light is reflected from the reflecting mirrors 21, 22 and 23 passes through air.

If the intensity of light reflected from the reflecting mirrors 21, 22 and 23 decreases, there is a drawback in that light transmission efficiency is lowered when light is transmitted between each of the light emitting and light receiving devices 12 and 13 and each of the optical fibers 32 and 33. Furthermore, use of many reflecting mirrors 21, 22, and 23 for reflecting light between each of the light emitting and receiving devices 12 and 13 and each of optical fibers 32 and 33 increases the number of parts and the number of assembling processes, thus increasing the manufacturing cost.

SUMMARY OF THE INVENTION

To solve the above problems, it is an objective of the present invention to provide an optical connector module having an improved structure so that light transmission efficiency is increased when light is transmitted between optical devices and optical fibers.

Accordingly, to achieve the above objective, the present invention provides an optical connector module including: a light emitting device which emits light and a light receiving device which receives light to convert an optical signal into an electrical signal; a connector including an optical fiber for light transmission and an optical fiber for light reception; a housing for coupling the optical module to the connector; and a light transmission device which is installed in the housing and includes an optical fiber for light transmission, one end of which is disposed on the side of the light emitting device so as to transmit light from the light emitting device to the optical fiber for light transmission of the connector and the other end of which is disposed on the side of the optical fiber for light transmission of the connector, and an optical fiber for light reception, one end of which is disposed on the side of the light receiving device so as to transmit light from the optical fiber for light reception of the connector to the light receiving device and the other end of which is disposed on the side of the optical fiber for light reception of the connector.

The distance between one end of the optical fiber for light transmission which is disposed in the housing and one end of the optical fiber for light reception which is disposed in the housing is greater than the distance between the other end of the optical fiber for light transmission which is disposed in the housing and the other end of the optical fiber for light reception which is disposed in the housing.

BRIEF DESCRIPTION OF THE DRAWINGS

The above objective and advantages of the present invention will become more apparent by describing in detail a preferred embodiment thereof with reference to the attached drawings, in which.

DETAILED DESCRIPTION OF THE INVENTION

Figure 1:
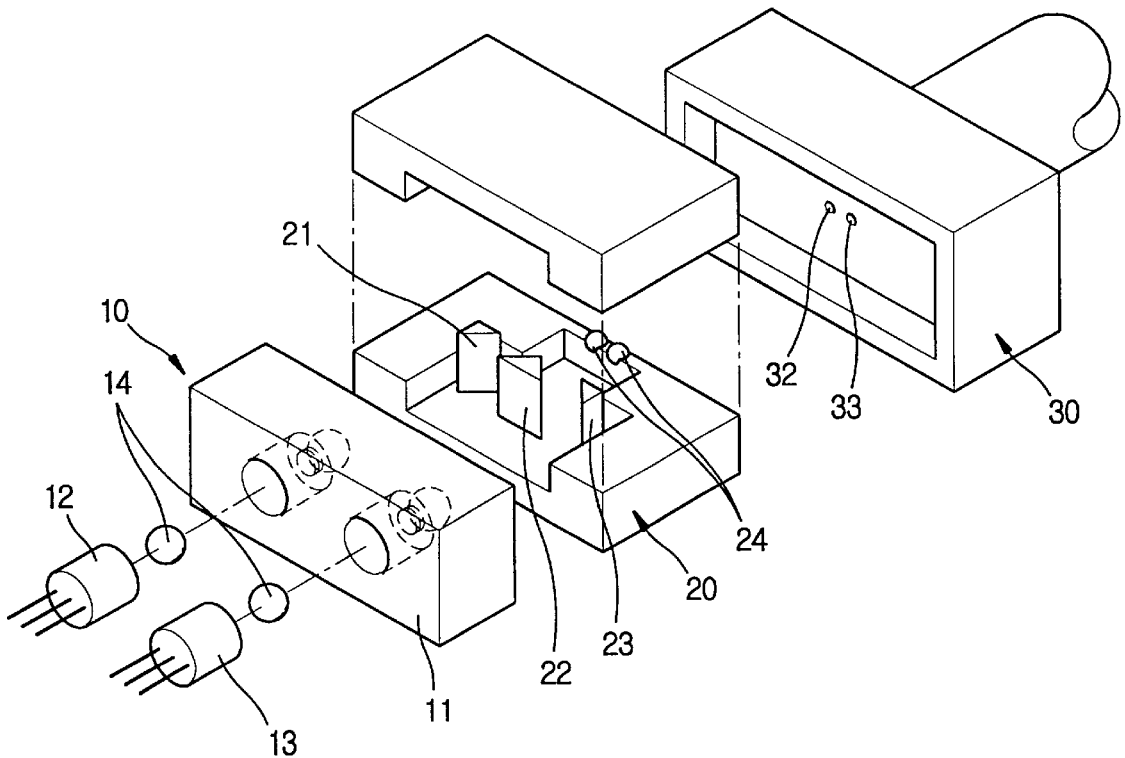
FIG. 1 is an exploded perspective view schematically showing a conventional optical connector module.
Figure 2:
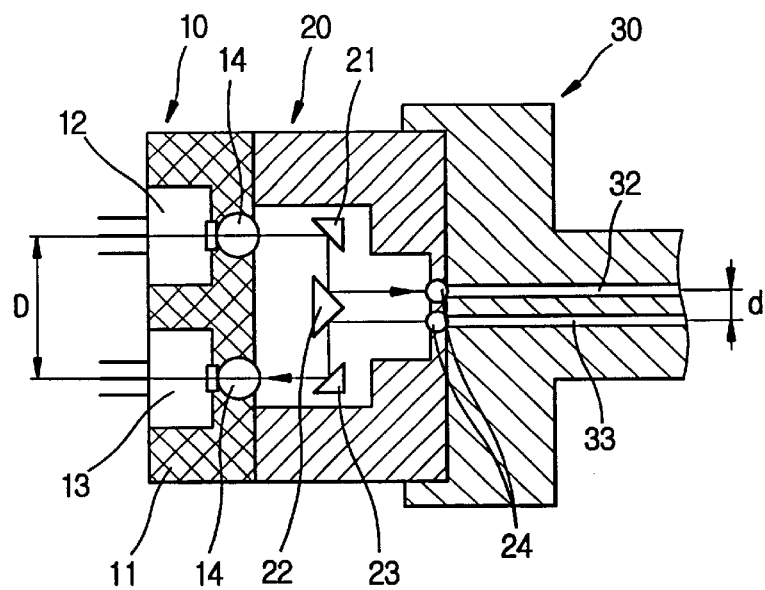
FIG. 2 is a cross-sectional view of the optical connector module of FIG. 1.
Figure 3:
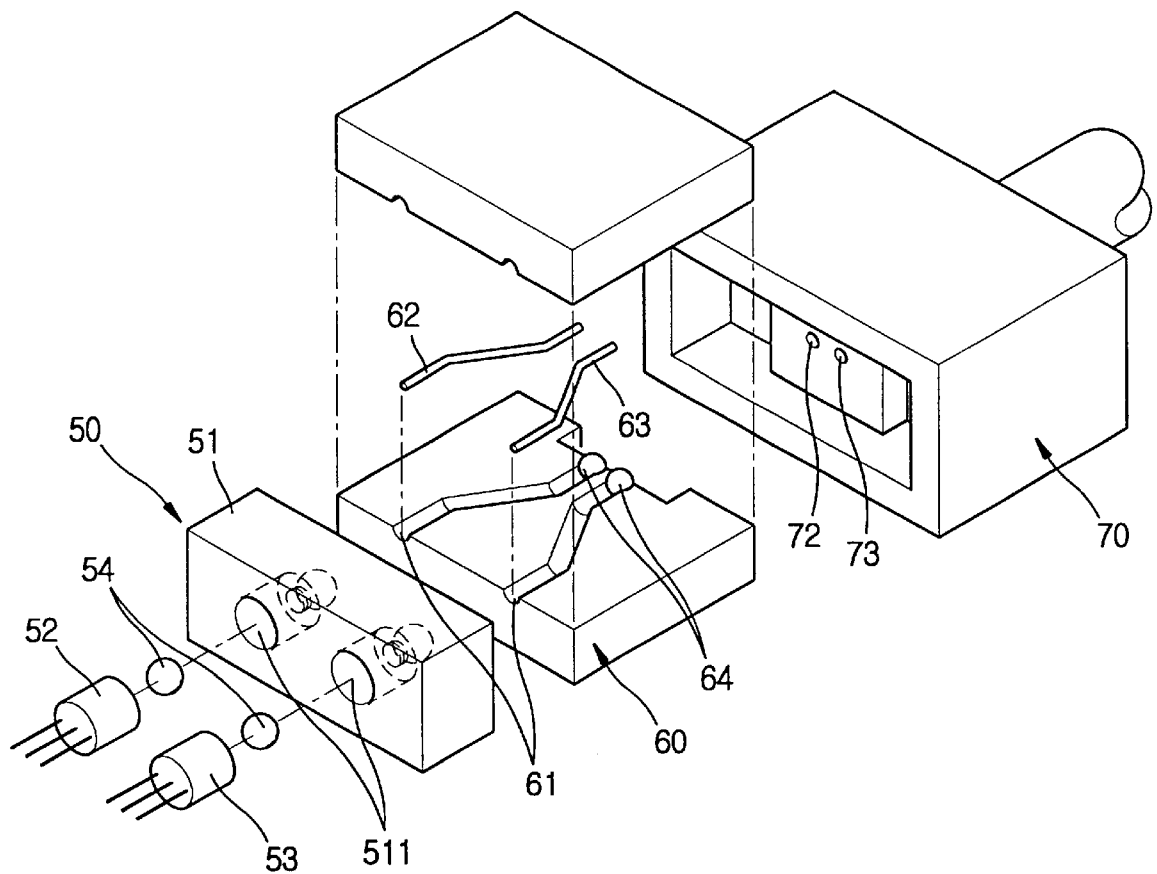
FIG. 3 is an exploded perspective view schematically showing an optical connector module according to an embodiment of the present invention.

Referring to FIG. 3, an optical connector module according to an embodiment of the present invention includes an optical module 50, a connector 70, and a housing 60. The optical module 50 includes a frame 51, a light emitting device 52, a light receiving device 53, and a pair of first lenses 54. The light emitting device 52 and the light receiving device 53 are installed in space or recess portions 511 which are provided within the frame 51, and convert electrical signals into optical signals by a semiconductor laser to emit light and receive an optical signal to convert optical signals into electrical signals, respectively. Each of the first lenses 54 focuses light emitted from the light emitting device 52 or focuses light incident on the light receiving unit 53.

An optical fiber 72 for transmitting light from the light emitting device 52 and an optical fiber 73 for transmitting light to the light receiving device 53 are installed within the connector 70. One end of the housing 60 adheres to the optical module 50 and the other end of the housing 60 is fitted into the connector 70. The housing 60 and the connector 70 may be coupled together by a screw coupling or bonding. In order to facilitate detachment, a hook coupling can be used.

Meanwhile, a light transmitting device of the optical connector module according to the present invention between the light emitting and light receiving devices 52 and 53, and the optical fibers 72 and 73 is different from the conventional art. The light transmitting device may be, for example, an optical fiber 62 for light transmission, an optical fiber 63 for light reception, and a pair of second lenses 64. The optical fiber 62 transmits light emitted from the light emitting device 52 to the optical fiber 72, while the optical fiber 63 for light reception transmits light received from the optical fiber 73 to the light receiving unit 53. The pair of second lenses 64 serve to focus light transmitted from the optical fiber 62 for light transmission to the optical fiber 72 and focus light transmitted from the optical fiber 73 to the optical fiber 63 for light reception.

One end of the optical fiber 62 for light transmission is disposed opposite one of the first lenses 54 on the side of light emitting device 52, while the other end thereof is approximately disposed opposite one of the second lenses 64. One end of the optical fiber 63 for light reception is disposed to oppose the other of the first lenses 54 on the side of light receiving device 53, while the other end thereof is disposed to oppose the other of the second lenses 64. Furthermore, guide portions 61 for respectively accommodating the optical fiber 62 for light transmission and optical fiber 63 for light reception are provided within the housing 60. The optical fibers 62 and 63 are respectively housed within the guide portions 61 and fixed to the housing 60 by an adhesive (not shown).

Figure 4:
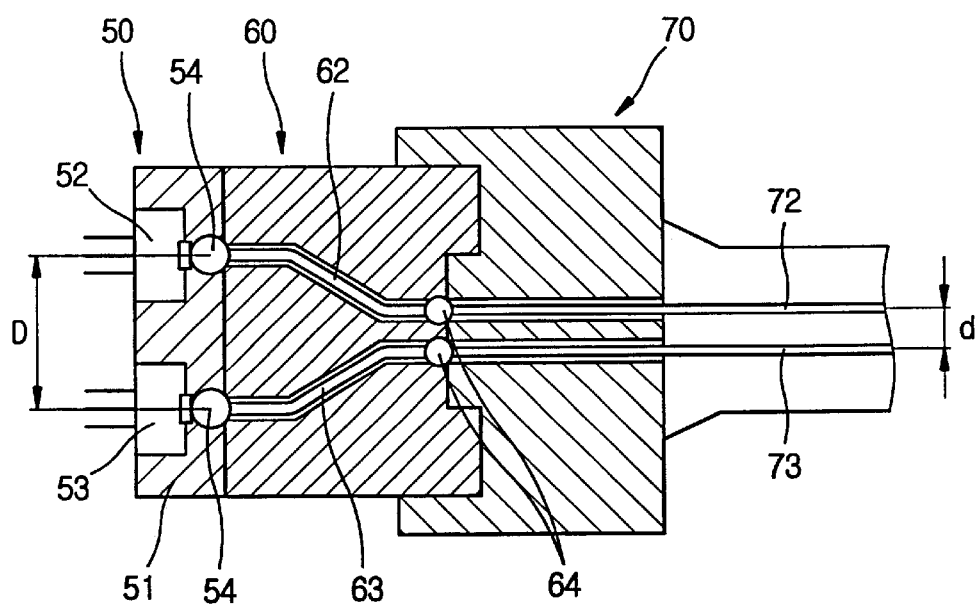
FIG. 4 is a cross-sectional view of the optical connector module of FIG. 3.

Since the diameters of the light emitting and light receiving devices 52 and 53 installed within the optical module 50 are larger than those of the optical fibers 72 and 73, as shown in FIG. 4, the distance D between the optical axes of the light emitting device 52 and the light receiving device 53 is greater than the distance d between the optical axes of the optical fiber 72 for light transmission and the optical fiber 73 for light reception.

In order to transmit light on optical paths between the light emitting and light receiving devices 52 and 53 and the optical fibers 72 and 73, the optical fiber 62 for light transmission and the optical fiber 63 for light reception according to the present invention have light permeability and flexibility like the optical fibers 72 and 73, so that the optical axes of the light emitting device 52 and the light receiving device 53 may connect with those of the optical fiber 72 for light transmission and the optical fiber 73 for light reception, respectively.

The operation of the optical connector module according to the embodiment of the present invention will now be described with reference to FIG. 4.

Referring to FIG. 4, light is emitted from the light emitting device 52 by an electrical signal to focus the light emitted through a corresponding one of the first lenses 54. The light focused by the corresponding first lens 54 is incident on the optical fiber 62 for light transmission which is installed within the housing 60. The light which has passed through the optical fiber 62 for transmission is focused again by a corresponding one of the second lenses 64 which is installed within the housing 60 to be incident on the optical fiber 72 for transmission through the connector 70. Furthermore, light transmitted from the optical fiber 73 for light reception is focused by the other of the second lenses 64 to be incident on the optical fiber 63 for light reception. Then, the light passing through the optical fiber 63 for light reception is focused by the other of the first lenses 54 and received by the light receiving device 53 to convert the light into an electrical signal.

According to the optical connector module as described above, the optical fibers 62 and 63 having flexibility are disposed on optical paths between the optical module 50 and the connector 70 and both ends of the optical fibers 62 and 63, respectively, are disposed in such a way as to adhere closely to the first and second lenses 54 and 64. Thus, light passes through the optical fibers 62 and 63 on optical paths between the light emitting and light receiving devices 52 and 53, and the optical fibers 72 and 73, and contact with air is reduced. By transmitting light through the optical fibers 62 and 63 on the optical paths between the light emitting and light receiving devices 52 and 53, and the optical fibers 72 and 73, loss of light which may occur at a boundary with the air is reduced, thus reducing light transmission loss.

The present invention exemplifies fixing of the optical fibers 62 and 63 to the respective guide portions 61 of the housing 60 by an adhesive, but the optical fibers 62 and 63 may be fixed to the housing 60 using a separate clamp element. Furthermore, although the embodiment of the present invention illustrates the configuration in which the optical module 50 has one light emitting device 52 and one light receiving device 53 and the pair of optical fibers 62 and 63 are installed in the housing 60, two or more light emitting and light receiving devices 52 and 53 may be provided and two or more pairs of optical fibers 62 and 63 may be installed in the housing 60.

As described in the foregoing, in the optical connector module according to the present invention, the optical module 50 within which the optical devices 52 and 53 are installed, is coupled to the connector 70 having the optical fibers 72 and 73 therein by way of the housing 60. Furthermore, the optical fibers 62 and 63 are installed in the housing 60 so as to transmit light between the optical devices 52 and 53 and the optical fibers 72 and 73. This invention can reduce the area in which light contacts air to minimize light transmission loss, compared with conventional light transmission using reflecting mirrors. Thus, reducing a loss during light transmission improves light transmission efficiency.

Furthermore, since one optical fiber is installed on each optical path between the optical device and the optical fiber, the invention can reduce the number of parts and the number of assembling processes accordingly, thus lowering the manufacturing cost.

Although the invention has been described with reference to a particular embodiment, the illustrated embodiment is only an example, and it should be understood by those skilled in the art that various changes in form and details may be made therein without departing from the spirit and scope of the invention as defined by the appended claims.

What is claimed is:

1. An optical connector module comprising:

an optical module including a light emitting device which emits light and a light receiving device which receives light to convert an optical signal into an electrical signal;

a connector including a first optical fiber for light transmission and a first optical fiber for light reception;

a housing for coupling the optical module to the connector; and a light transmission device which is installed in the housing and includes a second optical fiber for light transmission, one end which is disposed on the side of the light emitting device so as to transmit light from the light emitting device to the first optical fiber for light transmission of the connector and the other end which is disposed on a side of the first optical fiber for light transmission of the connector, and a second optical fiber for light reception, one end which is disposed on a side of the light receiving device so as to transmit light from the first optical fiber for light reception of the connector to the light receiving device and another end which is disposed on the side of the first optical fiber for light reception of the connector, wherein a distance between one end of the second optical fiber for light transmission which is disposed in the housing and one end of the second optical fiber for light reception which is disposed in the housing is greater than the distance between the other end of the second optical fiber for light transmission which is disposed in the housing and the other end of the second optical fiber for light reception which is disposed in the housing.

2. The optical connector module of claim 1, wherein the housing has a guide portion for respectively accommodating the second optical fiber for light transmission and the second optical fiber for light reception which are disposed in the housing, and wherein the second optical fiber for light transmission which is disposed in the housing and the second optical fiber for light reception which is disposed in the housing are respectively fixed to the guide portion of the housing by an adhesive.

3. The optical connector module of claim 1, wherein a first lens is installed between one end of each of the light emitting and light receiving devices and one end of each of the second optical fiber for light transmission which is disposed in the housing and the second optical fiber for light reception which is disposed in the housing so as to focus light that passes through them, and wherein a second lens is installed between the other end of each of the second optical fiber for light transmission which is disposed in the housing and the second optical fiber for light reception which is disposed in the housing and the other end of each of the first optical fibers disposed in the connector corresponding thereto so as to focus light passing through them.

* * * * *